(12) United States Patent
Kim et al.

(10) Patent No.: US 7,538,750 B2
(45) Date of Patent: May 26, 2009

(54) METHOD OF INSPECTING A FLAT PANEL DISPLAY

(75) Inventors: Jae-wan Kim, Anyang-si (KR); Hyoung-jo Jeon, Suwon-si (KR); Yong-sik Douglas Kim, Seoul (KR); Hwa-sub Shim, Suwon-si (KR); Heong-min Ahn, Youngin-si (KR); Ho-seok Choi, Seoul (KR); Myung-ho Jung, Suwon-si (KR); Min Hong, Seoul (KR); Joung-hag Kim, Suwon-si (KR); Young-su Ryu, Suwon-si (KR); Sung-chai Kim, Suwon-si (KR); Seung-gun Byoun, Suwon-si (KR); Suk-in Yoo, Seoul (KR); Kyu-nam Choi, Seoul (KR); Jae-yeong Lee, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 676 days.

(21) Appl. No.: 10/949,254

(22) Filed: Sep. 27, 2004

(65) Prior Publication Data

US 2005/0151760 A1 Jul. 14, 2005

(30) Foreign Application Priority Data

Jan. 14, 2004 (KR) .................. 10-2004-0002657

(51) Int. Cl.
*G09G 3/36* (2006.01)

(52) U.S. Cl. ......................... 345/87; 345/904

(58) Field of Classification Search ................. 348/246; 382/149; 250/559.45, 559.46; 345/690, 345/87, 904; 356/394
See application file for complete search history.

(56) References Cited

U.S. PATENT DOCUMENTS

| 5,204,660 | A | * | 4/1993 | Kamagami et al. | ............ 345/95 |
| 5,650,844 | A | * | 7/1997 | Aoki et al. | ............... 356/237.2 |
| 6,779,159 | B2 | * | 8/2004 | Yokoyama et al. | ............. 716/4 |
| 6,947,083 | B2 | * | 9/2005 | Nakajima | .................... 348/246 |
| 6,947,587 | B1 | * | 9/2005 | Maeda et al. | ............... 382/149 |
| 7,142,708 | B2 | * | 11/2006 | Sakai et al. | ................. 382/149 |
| 2002/0009220 | A1 | * | 1/2002 | Tanaka | ....................... 382/145 |
| 2002/0149683 | A1 | * | 10/2002 | Post | .......................... 348/246 |

FOREIGN PATENT DOCUMENTS

| JP | 2000-162139 A | 6/2000 |
| KR | 1999-49936 | 7/1999 |
| KR | 1999-85013 | 12/1999 |
| KR | 2001-101697 | 11/2001 |

* cited by examiner

*Primary Examiner*—Chanh Nguyen
*Assistant Examiner*—Pegeman Karimi
(74) *Attorney, Agent, or Firm*—Stanzione & Kim, LLP

(57) ABSTRACT

A method of inspecting a flat panel display including inputting an image data signal into the flat panel display, obtaining an image displayed on the flat panel display in response to the input image data signal with a camera, extracting a raw brightness information corresponding to each location from the obtained image, calculating a fitting brightness information corresponding to each location through the curve fitting based on the raw brightness information, calculating a brightness difference corresponding to each location between the raw brightness information and the fitting brightness information, and detecting stain locations with the brightness difference beyond a predetermined permitted limit.

14 Claims, 7 Drawing Sheets

METHOD OF INSPECTING A FLAT PANEL DISPLAY

CROSS-REFERENCE TO RELATED APPLICATIONS

This application claims the benefit of Korean Patent Application No. 2004-2657, filed Jan. 14, 2004, in the Korean Intellectual Property Office, the disclosure of which is incorporated herein by reference.

BACKGROUND OF THE INVENTION

1. Field of the Invention

The present invention relates to method of inspecting a flat panel display, and more particularly, to method of inspecting a partial stain of a flat panel display.

2. Description of the Related Art

A partial stain of a flat panel display is an image that looks like a spot on a part of the screen of the flat panel display due to non-uniformity of brightness. In order to inspect the partial stain, it is a usual operation to output a test image to a display panel and analyze the state of the test image. There are manual and automatic inspection methods for analyzing the state of the test image.

The manual inspection method is for a professional inspector to find and evaluate the stain visible to the naked eye. By this method, the inspector's subjective decision about the quality of the panel can not guarantee the qualitative uniformity of the panel. The manual inspection method has some problems. For example, the process speed of the manual inspection is not as fast as that of an automatic inspection method. Moreover, it is very difficult for the inspector to obtain the required skill of detection to the level of dependability.

Meanwhile, the automatic inspection method is performed by obtaining the test image on the panel with a photographing apparatus, like a camera, and detecting the defect through an image processing operation. The image processing operation includes detecting the brightness information from the test image obtained by the camera and comparing it with a predetermined brightness reference. As a result of the comparing operation, the defect of the panel is determined according to whether the difference of the comparison between the brightness information and the brightness reference is beyond a permitted limit.

The brightness reference in the image procession is constantly applied to all of the panels to be inspected. However, the partial stain is due to a relative brightness difference according to the location on the screen, not due to an absolute brightness beyond the brightness reference. Further, because the brightness characteristic of the panel affects the real brightness, detecting the defect must be evaluated relatively according to each panel. Therefore, the conventional automatic method for inspecting a flat panel display, which constantly applies one brightness reference to all of the panels, does not guarantee the accuracy of the detection of the defects.

SUMMARY OF THE INVENTION

Accordingly, it is an aspect of the present invention to provide a method of inspecting a flat panel display, which can find a partial stain and determine defects more quickly and precisely.

Additional aspects and/or advantages of the present invention will be set forth in part in the description which follows and, in part, will be obvious from the description, or may be learned by practice of the invention.

The foregoing and/or other aspects of the present invention are achieved by providing a method of inspecting a flat panel display, the method comprising: inputting an image data signal to the flat panel display; obtaining an image displayed on the flat panel display corresponding to the input signal with a camera; extracting a raw brightness information corresponding to each location from the obtained image; calculating fitting brightness information corresponding to each location through a curve fitting based on the raw brightness information; calculating a brightness difference corresponding to each location between the raw brightness information and the fitting brightness information; and detecting stain locations with the brightness difference beyond a predetermined permitted limit.

According to an aspect of the invention, the method of inspecting the flat panel display further includes representing a numerical defect with a contrast and an area of a stain part formed by the stain locations; and determining whether the stain part is a final defect if the numerical defect is beyond a predetermined defect reference value.

According to another aspect of the invention, in the method of inspecting a flat panel display, the numerical defect is calculated through a following formula;

$$\text{numerical defective} = \frac{CS^k}{aS^k + b},$$

where S and C respectively represent the area and the contrast of the stain part and a, b and k are random numbers.

According to another aspect of the invention, in the method of inspecting the flat panel display, a curve fitting uses a least square regression.

The foregoing and/or other aspects of the present invention may also be achieved by providing a method of inspecting a flat panel display, the method including inputting an image data signal into the flat panel display, obtaining an image displayed on the flat panel display corresponding to the input image data signal with a camera, extracting raw brightness information corresponding to each location from the obtained image, calculating fitting brightness information corresponding to each location through a curve fitting based on the raw brightness information, calculating a brightness difference corresponding to each location between the raw brightness information and the fitting brightness information, detecting background locations with the brightness difference between the raw brightness information and the fitting brightness information within a predetermined permitted limit, calculating background brightness information corresponding to each location through the curve fitting based on the raw brightness information of the background locations, calculating a brightness difference between the raw brightness information and the background brightness information corresponding to each location, and detecting stain locations with the brightness difference between the raw brightness information and the background brightness information beyond a predetermined reference limit.

According to an aspect of the present invention, the method of inspecting a flat panel display may further include representing a numerical defect with a contrast and an area of a stain part formed in the stain locations; and deciding whether the stain part is a final defect if the numerical defect is beyond a predetermined defect reference value.

According to another aspect of the present invention, in the method of inspecting a flat panel display, the numerical defect is calculated using a following formula;

$$\text{numerical defective} = \frac{CS^k}{aS^k + b},$$

where S and C respectively represent the area and the contrast of the stain part and a, b and k are random numbers.

According to another aspect of the present invention, in the method of inspecting a flat panel display, a curve fitting uses a least square regression.

BRIEF DESCRIPTION OF THE DRAWINGS

These and other aspects and/or advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
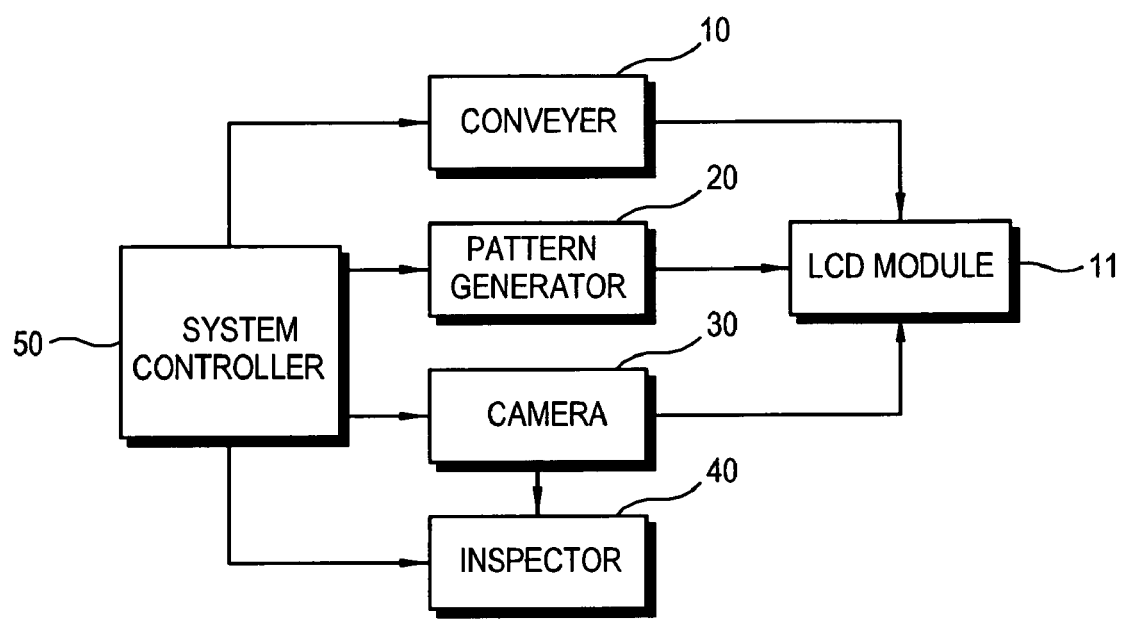
FIG. 1 is a schematic block diagram of an apparatus to detect a partial stain of an LCD module according to an embodiment of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

FIG. 1 is a schematic block diagram of an apparatus to detect a partial stain of a flat panel display, such as an LCD module, according to an embodiment of the present invention.

As shown in FIG. 1, an apparatus to detect a partial stain of the LCD module 11 comprises a conveyer 10, a pattern generator 20, a camera 30, an inspector 40 and a system controller 50.

The conveyer 10 comprises a roller, a motor, etc., to carry the LCD module 11 in and/or out of an inspecting stage. The pattern generator 20 provides the LCD module 11 with image data signals for a test. The camera 30 includes various cameras, such as a still image video camera, a digital camera and the like, to obtain an image displayed on the flat panel display corresponding to the image data signals provided by the pattern generator 20. The inspector 40 analyzes the image obtained with the camera 30 and discriminates defects from the normal LCD modules 11. The system controller 50 controls the work of the conveyer 10, the pattern generator 20, the camera 30 and the inspector 40, respectively.

The apparatus to detect the partial stain of an LCD module 11 works as follows.

First, the system controller 50 controls the conveyer to carry the LCD module 11 to be inspected in an inspecting stage. After the, LCD module 11 is positioned in the inspecting stage, the pattern generator 20 inputs the image data signals to display the test image on an LCD screen of the LCD module. At this time, the test image displayed on the LCD screen is transferred to the inspector 40 through the camera 30.

The inspector 40 analyzes the test image and decides if the LCD module is defective so as to give the system controller 50 the results. The system controller 50 displays the results for a human inspector to view, or sorts out the bad LCD module 11 so as to have the conveyer 10 carry it out.

Herein below, the analysis process of the inspector 40 will be described in more detail while referring to FIGS. 2-7A.

Figure 2:
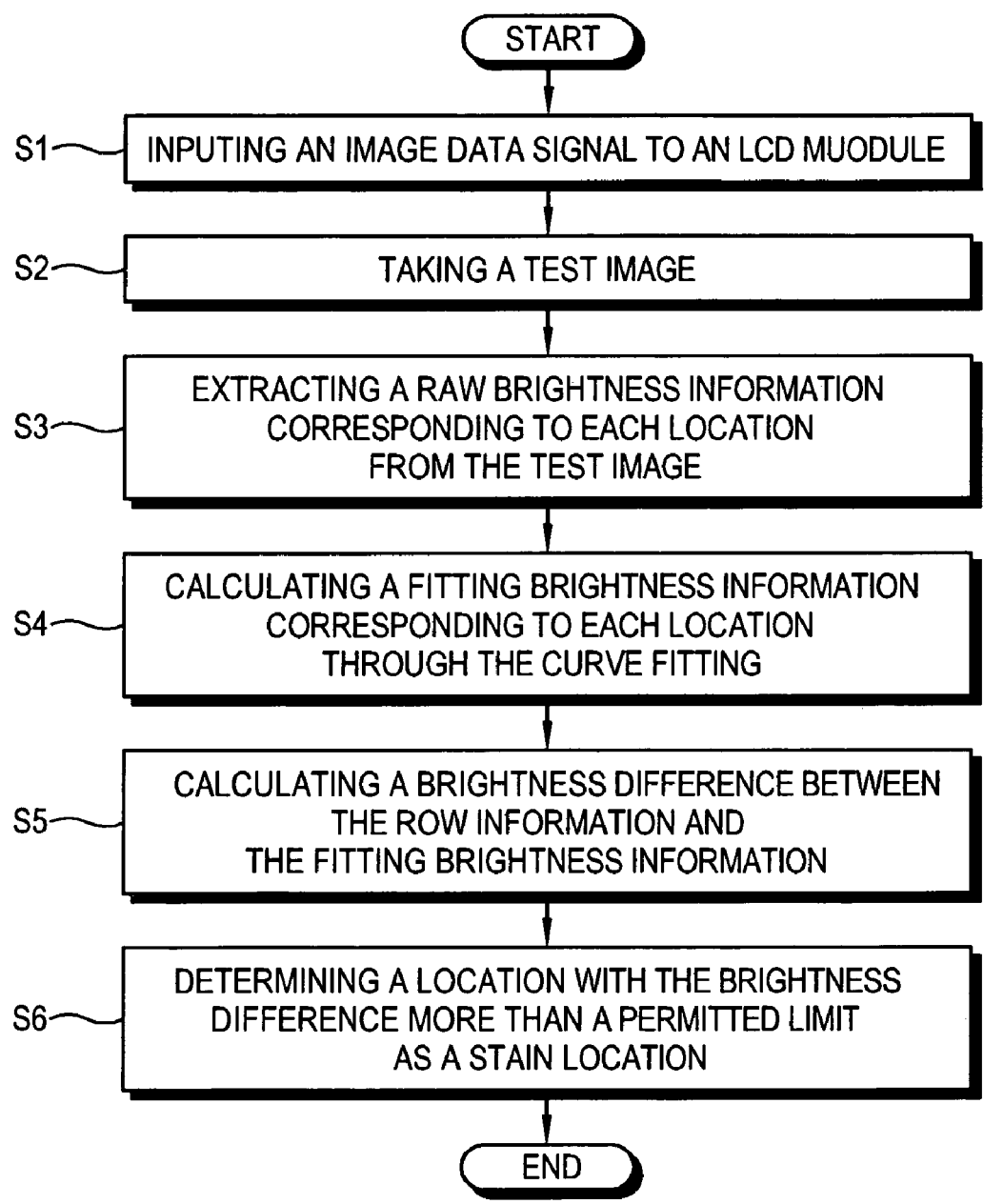
FIG. 2 illustrates a flow chart of a method of inspecting a flat panel display of FIG. 1, according to another embodiment of the present invention.

FIG. 2 illustrates a flow chart of a method of inspecting the flat panel display of FIG. 1, according to another embodiment of the present invention.

First, the LCD module 11 is carried to the inspecting stage and image data signals are input to the LCD module 11, at operation S1. Next, the test image is taken with the camera 30, at operation S2.

The inspector 40 extracts raw brightness information corresponding to each location from the image taken, at operation S3. Moreover, the raw brightness information corresponding to coordinates is restored in a memory if the test image is taken with a charge coupled device (CCD) camera.

Next, fitting brightness information corresponding to each location is calculated based on the raw brightness information through a curve fitting, at operation S4. The curve fitting is one of the various interpolation methods which represent the distribution tendency of the discrete data as a curved line or surface. An equation (1) below represents the approximate surface equation through the curve fitting, $$Z = a_1 X^2 + a_2 XY + a_3 Y^2 + a_4 X + a_5 Y + a_6 \qquad \text{Equation (1)}$$

where X and Y represent coordinates, and $a_1$~$a_6$ and Z represent coefficients and data, respectively.

If adequate coefficients are selected, the curve fitting shows a graph through the equation (1). All of the coefficients can be calculated adequately with a least square regression.

An equation (2) represents the least square regression to compute the approximate surface equation's coefficients:

$$e = \sum_{i=0}^{N-1} (Zi - a_1 X_i^2 - a_2 X_i Y_i - a_3 Y_i^2 - a_4 X_i - a_5 Y_i - a_6) \qquad \text{Equation (2)}$$

where $X_i$ and $Y_i$ represent coordinates, $a_1 \sim a_6$ represent coefficients, and $Z_i$ represents discrete image data information corresponding to $X_i$ and $Y_i$, respectively.

In equation (2), 'e' represents the sum of the square of the error between real data and the data of the approximate surface equation. Therefore, the approximate surface equation is optimized by the coefficients minimizing the 'e'.

$$\frac{\partial e}{\partial a_1} = 0 \qquad \text{Equation (3)}$$

The partial differential equations for $a_2 \sim a_6$, using equation 3, is set up and the solutions of simultaneous equations are the coefficients. This completes the approximate surface equation, and the brightness data corresponding to each location is computed by using equation 1.

Figure 3A:
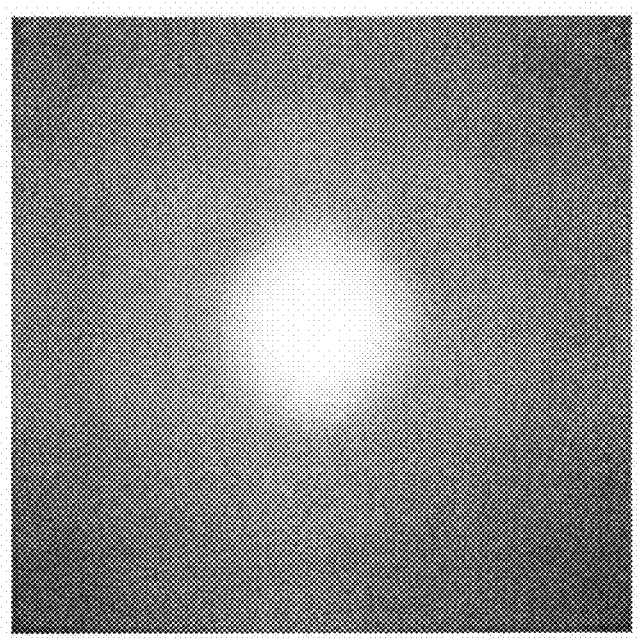
FIG. 3A illustrates a stain displayed in the center of a screen when an LCD module receives the image data signals of a predetermined color.
Figure 3B:
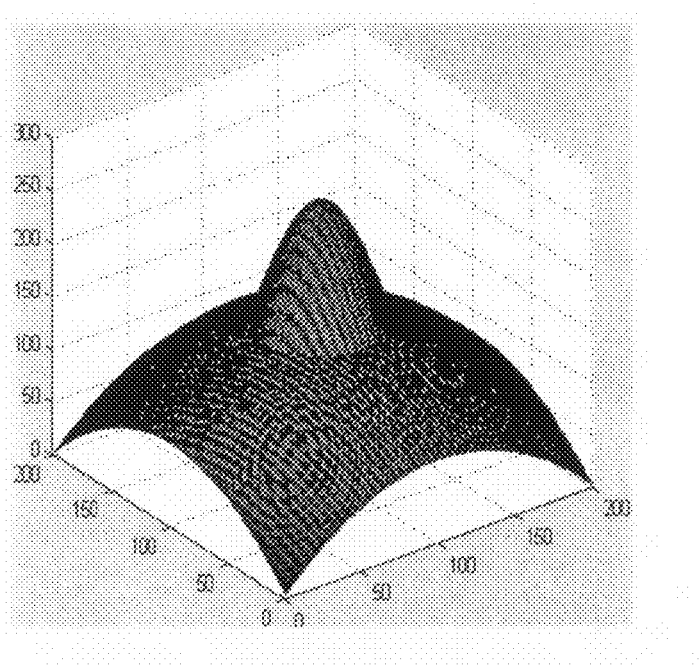
FIG. 3B illustrates a center-rising 3D graph which represents the brightness of an image corresponding to the position of the stain.

The following explanation of processing the test image characterized by FIGS. 3A and 3B will increase one's understanding.

FIG. 3A shows the stain displayed in the center of the screen when the LCD module 11 receives the image data signals of a predetermined color from the pattern generator 20. The center-rising 3D graph in FIG. 3B represents the brightness of the image corresponding to the position of the stain. More specifically, the 3D graph is divided into 2 parts. One hilly 3D graph (referred to as a "lower part graph") has a large radius of curvature and is located under another bell-shaped 3D graph. The other bell-shaped 3D graph (referred to as an "upper part graph") has the small radius of curvature and is located on the lower part graph.

Figure 4A:
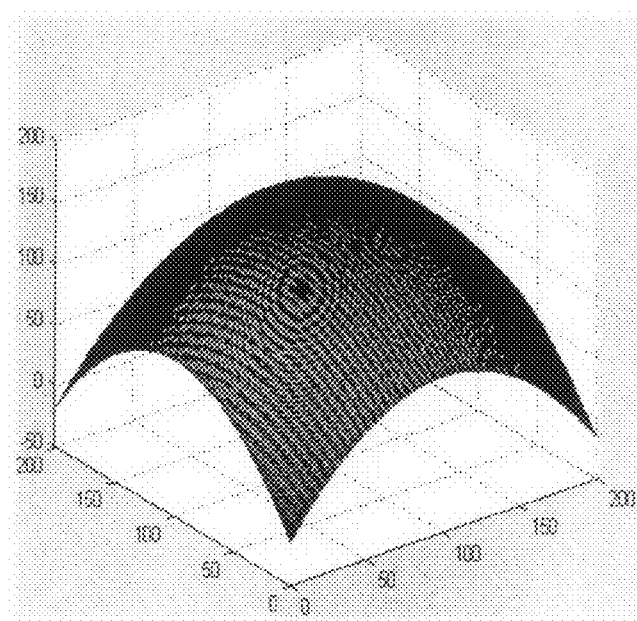
FIG. 4A represents the 3D graph of the fitting brightness information through a curve fitting with the raw brightness information depicted in FIG. 3B.
Figure 4B:
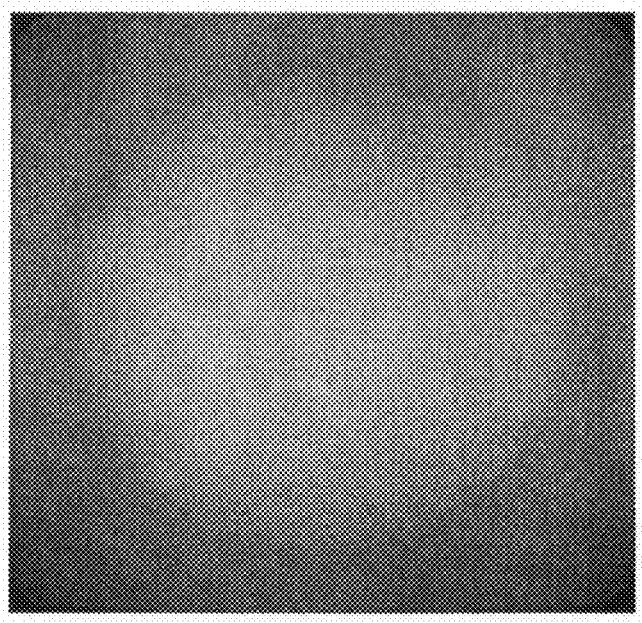
FIG. 4B illustrates a real image according to FIG. 4A.

FIG. 4A represents the 3D graph of the fitting brightness information through the curve fitting with the raw brightness information depicted in FIG. 3B. A real image according to FIG. 4A is illustrated in FIG. 4B.

The approximate curve surface in FIG. 4A is like a center-rising hill. It is similar with that in FIG. 3B but has the magnitude different from that in FIG. 3B. In detail, the maximum fitting brightness information in FIG. 4A is larger than the maximum of the lower part graph in FIG. 3B, but smaller than the maximum of the upper part graph in FIG. 3B. On the other hand, the minimum fitting brightness information near the edge in FIG. 4A is smaller than the minimum of the graph in FIG. 3B. The approximate curve surface by the curve fitting can be depicted as a graph having a characteristic of discrete data.

The approximate curve surface in FIG. 4A is continuous, but the fitting brightness information as the basic data of the curved surface has the discrete distribution corresponding to coordinates.

Next, a brightness difference corresponding to each location between the raw brightness information and the fitting brightness information is calculated at operation S5. The brightness difference is visible like an approximate curve surface to be formed by subtracting the approximate curve surface in FIG. 4A from the raw curve surface in FIG. 3B.

Figure 5A:
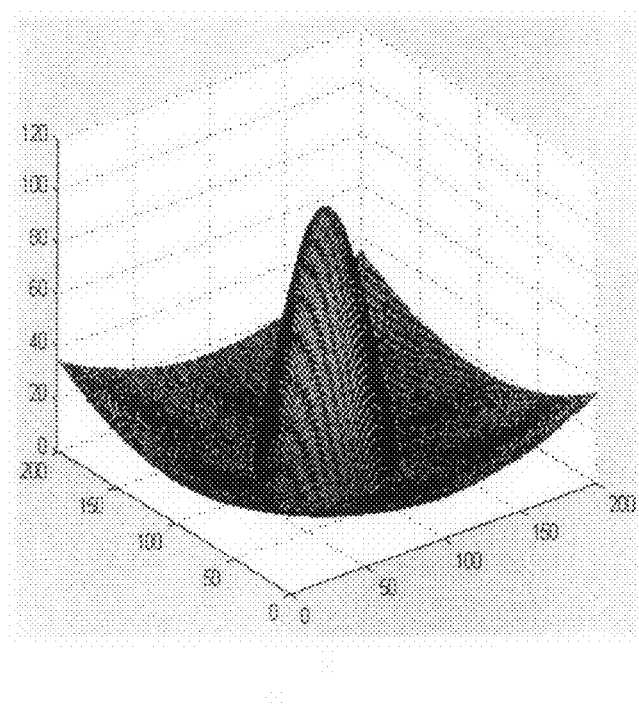
FIG. 5A represents a curve surface approximating a brightness difference corresponding to each location between the raw brightness information and the fitting brightness information.
Figure 5B:
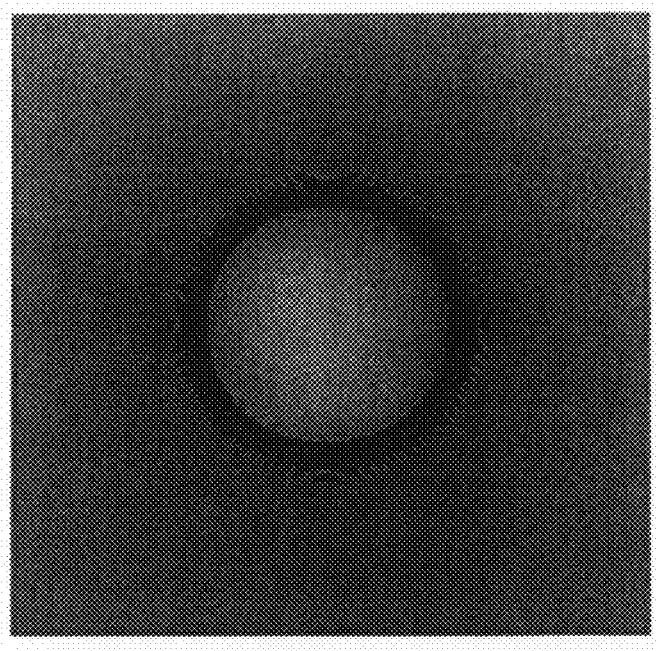
FIG. 5B shows a real image according to FIG. 5A.

FIG. 5A represents the curve surface approximating the brightness difference corresponding to each location between the raw brightness information and the fitting brightness information. A real image according to FIG. 5A is showed in FIG. 5B.

Now, a location in which the brightness difference between the raw brightness information and the fitting brightness information of which is beyond a predetermined permitted limit is detected as a stain location, at operation S6. A hypothetical plane is parallel to the X-Y plane and crosses at the point of brightness information corresponding to the permitted limit on the Z-axis in FIG. 5A. The hypothetical plane intersects the curve surface approximating the brightness difference so as to form an intersection surface. A stain part is determined as the region to be formed when the intersection surface is projected on the X-Y plane.

By the way, the accuracy in the detection of the stain part is changeable due to the permitted limit.

That is, as illustrated in FIG. 5A, the curve surface approximating the brightness difference has the central rising region and the edge-rolling margin regions. If the permitted limit is selected whereby the hypothetical plane crosses the curve surface at the edge-rolling margin region, the central stain part may be detected nearly in the same region as the central rising region. But the edge-rolling margin region appears to be interpreted as the stain part. To the contrary, the permitted limit not allowing the intersection at the edge-rolling margin region may cause a big error in detection of the central stain part.

This error due to the edge-rolling margin region results from the upper part graph's affecting the curve fitting for the approximate curve surface in FIG. 4A. Hence, the stain parts can be more precisely detected by repeating the curve fitting. For the first time, the curve fitting could outline approximately the stain parts and the other parts (herein after referred to as "background parts"). Subsequently, a second curve fitting based on the raw brightness information at the background parts allows a very accurate detection of the stain parts.

Figure 6:
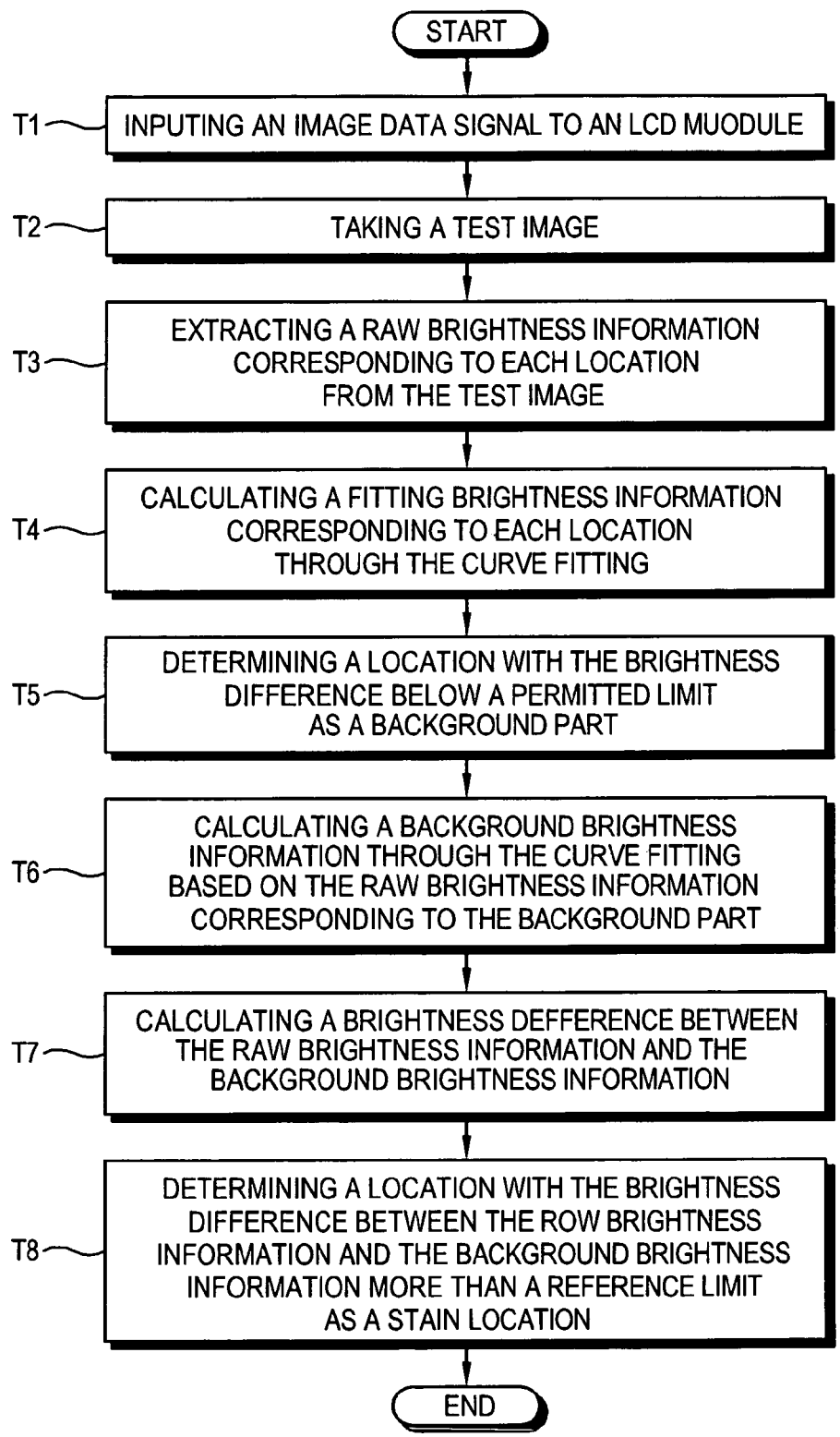
FIG. 6 illustrates a flow chart of a method of inspecting a flat panel display according to another embodiment of the present invention.

FIG. 6 illustrates a flow chart of a method of inspecting a flat panel display according another embodiment of the present invention.

The operations T1~T4 in FIG. 6 is the same as the operations S1~S4 in FIG. 2, and therefore an explanation thereof will be omitted.

At next operation T5, the background part is determined as the region where the brightness difference between the raw brightness information and the fitting brightness information is below the permitted limit. For the example, the permitted limit is allowed to be more than the fitting brightness information at the margin region. That causes the background part to include a part of the central rising part.

At operation T6, background brightness information corresponding to each location is calculated based on the raw brightness information at the background part through the curve fitting. The raw brightness information with the curve fitting corresponds to the background part, but the background brightness information includes all of the locations. The background brightness information is the discrete data according to locations, and the approximate continuous curve surface thereof is similar to the lower part graph in FIG. 3B.

Figure 7A:
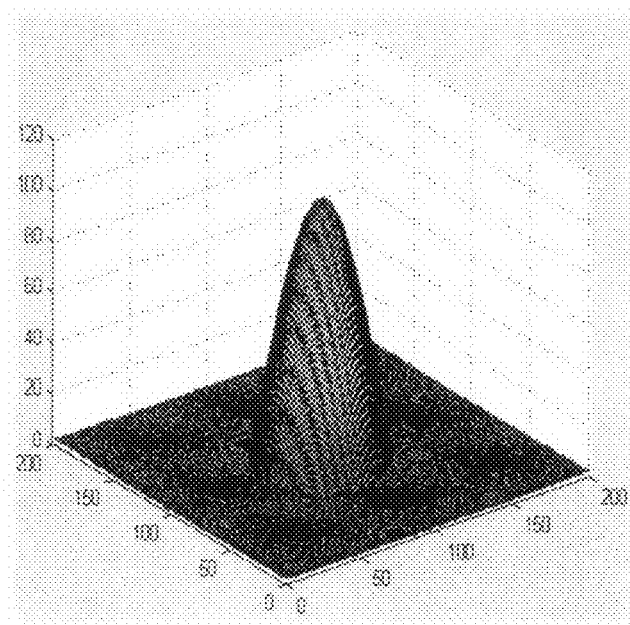
FIG. 7A illustrates a curve surface representing the brightness difference between a background brightness information and an original curve surface in FIG. 3B.
Figure 7B:
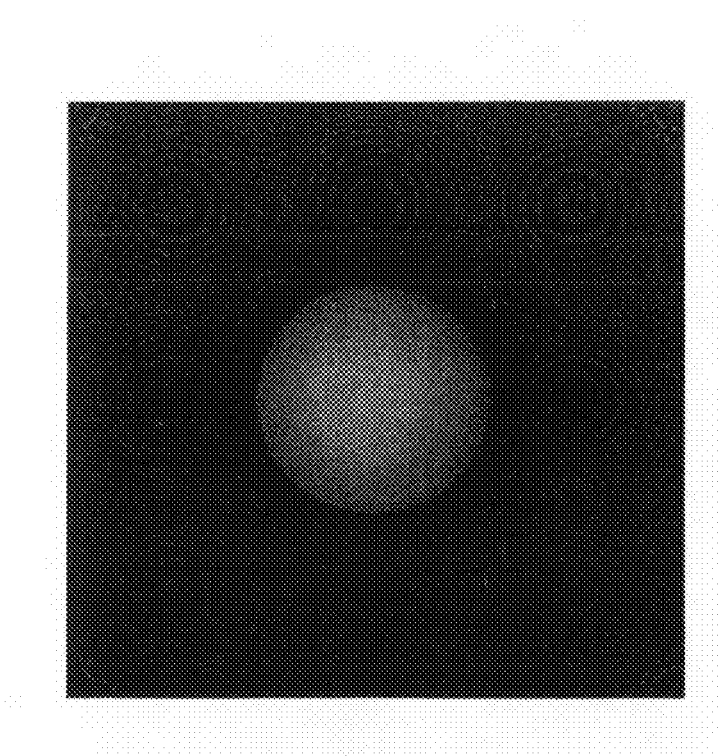
FIG. 7B shows a real image according to FIG. 7A.

Next, a brightness difference between the raw brightness information and the background brightness information is calculated at operation T7. FIG. 7A illustrates the curve surface representing the brightness difference between the background brightness information and the original curve surface in FIG. 3B. This is analogous to the upper part graph of the original curve surface in FIG. 3B. The curve surface in FIG. 7A has the bell-shaped central region and the planar margin region. FIG. 7B shows a real image according to FIG. 7A.

At operation T8, a stain location with the brightness difference between the raw brightness information and the background brightness information beyond a predetermined reference limit is detected, and a stain part is determined as a region formed by the stain locations. The stain part in FIG. 7A may be a projection plane of the bell-shaped central region in the X-Y plane.

It is an aspect of this embodiment to decide on whether the LCD module is a defective module or not according to the area and the contrast of the stain part relative to its outskirts. This can be achieved by the following numerical defect (hereinafter referred to as "SEMU index"):

$$SEMU\ index = \frac{CS^k}{aS^k + b} \qquad \text{Equation 4}$$

where C and S represent the contrast and the area of the stain part. a, b, and k represents random constants.

The numerical defect may be defined as various algebraic expressions. The broader and the larger the area and the contrast of the stain part become, respectively, the worse the defect becomes. Any expression having these mutual relationships couldn't be bad. "K" in the equation 4 has the value more than 1 in order to satisfy these relationships.

The area and the contrast of the stain part are computed so as to get the SEMU index. Herein, the contrast of the stain part may be a relative ratio of brightness of its outskirts. Therefore, each average brightness of the stain part and its outskirts is computed and the contrast may be defined as the ratio thereof. When there are many stain parts, the SEMU index is computed for all of the stain parts and it is decided whether the LCD module is defective or not.

The LCD panel is judged defective when the SEMU index is more than a predetermined defective reference value. The system controller 50 displays and notices the results of the inspection to the human inspector. Otherwise, the system controller 50 discriminates the bad LCD module itself.

The above embodiments provide inspection of a partial stain of the flat panel display with more rapidity and precision.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of inspecting a flat panel display, the method comprising:
    inputting an image data signal to the flat panel display;
    obtaining an image displayed on the flat panel display corresponding to the input image data signal with a camera;
    extracting raw brightness information corresponding to each location from the obtained image;
    calculating fitting brightness information corresponding to the each location through a curve fitting based on the raw brightness information;
    calculating a brightness difference corresponding to the each location between the raw brightness information and the fitting brightness information; and
    detecting stain locations with the brightness difference beyond a predetermined permitted limit,
    wherein the fitting brightness information corresponds to approximate value of the raw brightness information corresponding to the each location.

2. The method of inspecting a flat panel display according to claim 1, further comprising:
    representing a numerical defect with a contrast and an area of a stain part formed by the stain locations; and
    determining whether the stain part is a final defect if the numerical defect is beyond a predetermined defect reference value.

3. The method of inspecting a flat panel display according to claim 2, wherein the numerical defect is calculated through the formula:

$$\text{numerical defect} = \frac{CS^k}{aS^k + b},$$

where S and C respectively represent the area and the contrast of the stain part and a, b and k are random numbers.

4. The method of inspecting a flat panel display according to claim 1, wherein the curve fitting uses a least square regression.

5. A method of inspecting a flat panel display comprising:
    inputting an image data signal to the flat panel display;
    obtaining an image displayed on the flat panel display corresponding to the input image data signal with a camera;
    extracting raw brightness information corresponding to each location from the obtained image;
    calculating fitting brightness information corresponding to the each location through a curve fitting based on the raw brightness information;
    calculating a brightness difference corresponding to the each location between the raw brightness information and the fitting brightness information;
    detecting background locations with the brightness difference between the raw brightness information and the fitting brightness information within a predetermined permitted limit;
    calculating background brightness information corresponding to the each location through the curve fitting based on the raw brightness information of the background locations;
    calculating a brightness difference between the raw brightness information and the background brightness information corresponding to the each location; and
    detecting stain locations with the brightness difference between the raw brightness information and the background brightness information beyond a predetermined reference limit
    wherein the fitting brightness information corresponds to approximate value of the raw brightness information corresponding to the each location.

6. The method of inspecting a flat panel display according to claim 5, further comprising:
    representing a numerical defect with a contrast and an area of a stain part formed by the stain locations;
    determining whether the stain part is a final defect if the numerical defect is beyond a predetermined defect reference value.

7. The method of inspecting a flat panel display according to claim 6, wherein the numerical defect is calculated through the formula;

$$\text{numerical defect} = \frac{CS^k}{aS^k + b},$$

where S and C respectively represent the area and the contrast of the stain part and a, b and k are random numbers.

8. The method of inspecting a flat panel display according to claim 5, wherein the curve fitting uses a least square regression.

9. A method of inspecting a flat panel display comprising:
   obtaining a test image displayed on the flat panel display; and
   detecting a stain location from the obtained test image using a curve fitting of raw brightness information of the test image, wherein the detecting a stain location comprises:
   extracting raw brightness information corresponding to each location from the obtained image;
   calculating fitting brightness information corresponding to the each location though the curve fitting based on the raw brightness information;
   calculating a brightness difference corresponding to the each location between the raw brightness information and the fitting brightness information; and
   detecting stain locations with the brightness difference beyond a predetermined permitted limit,
   wherein the fitting brightness information corresponds to approximate value of the raw brightness information corresponding to the each location.

10. The method of inspecting a flat panel display according to claim 9, wherein the test image is generated by inputting test image data signals into the flat panel display.

11. The method of inspecting a flat panel display according to claim 9, wherein the test image is obtained by using a camera.

12. The method of inspecting a flat panel display according to claim 9, further comprising:
   representing a numerical defect with a contrast and a area of a stain part formed by the stain locations; and
   determining whether the stain part is a final defect if the numerical defect is beyond a predetermined defect reference value.

13. The method of inspecting a flat panel display according to claim 9, wherein the curve fitting uses a least square regression.

14. An apparatus to detect a partial stain of a flat panel screen of a flat panel display, comprising:
   a pattern generator to input image data signals to the flat panel display to display a test image on the flat panel display screen;
   a camera to obtain the displayed test image; and
   an inspecting unit to detect stain locations of the flat panel display screen based on the test image displayed using a curve fitting corresponding to the test image obtained,
   wherein the inspecting unit detects stain locations by extracting a raw brightness information corresponding to each location from the obtained image, calculating a fitting brightness information corresponding to the each location through a curve fitting based on the raw brightness information, calculating a brightness difference corresponding to the each location between the raw brightness information and the fitting brightness information, and detecting stain locations with the brightness difference beyond a predetermined permitted limit,
   wherein the fitting brightness information corresponds to approximate value of the raw brightness information corresponding to the each location.

* * * * *